Jan. 18, 1949.   F. C. FANTZ   2,459,271

HAND WHEEL

Filed June 27, 1946

INVENTOR
FRED C. FANTZ
By J.H.G.Cool
ATTORNEY

Patented Jan. 18, 1949

2,459,271

UNITED STATES PATENT OFFICE 2,459,271

HANDWHEEL

Fred C. Fantz, Lima, Ohio, assignor to Midwest Piping & Supply Company, Inc., St. Louis, Mo., a corporation of Missouri Application June 27, 1946, Serial No. 679,601

1 Claim. (Cl. 74—552)

This invention relates to hand wheels, and particularly to a wheel intended for use in operating a valve in a pipe line through which fluids, either gas or liquid, of high temperature, may flow, the main object of the invention being the production of a hand wheel so constructed that it may be bent, damaged, etc., and be straightened or repaired without impairing its usefulness, or fracture of any of its component parts; also its component parts will serve to radiate and disperse a large part of the heat which would otherwise be transmitted to the wheel rim from the valve stem, which is in direct contact with the heated fluid and with which it is associated, so that by the use of a built up hub having more radiating surface in relation to the volume of metal than the usual cast or forged hubs the wheel can be operated with a greater degree of safety and comfort, and with a longer period of usefulness.

Another object of the invention is the production of a hand wheel from bar stock or tubular metal, which is so manipulated as to dispense with the necessity of a multiple number of patterns to cover the range of size generally used in the class of work to which this type of wheel is best suited. Heretofore in making wheels of this type it has been the practice to mold the wheel, which has necessitated the use of separate patterns for each size or weight. Through the use of my method a wheel of any size can be produced from straight stock of standard cross-sections. The advantage of this procedure is obvious, i. e., the expense incident to obtaining a separate mold for each wheel to be produced is eliminated; and an additional advantage is that it takes less time to form a wheel through the use of my method than by casting or molding it.

In the drawings—

Figure 1:
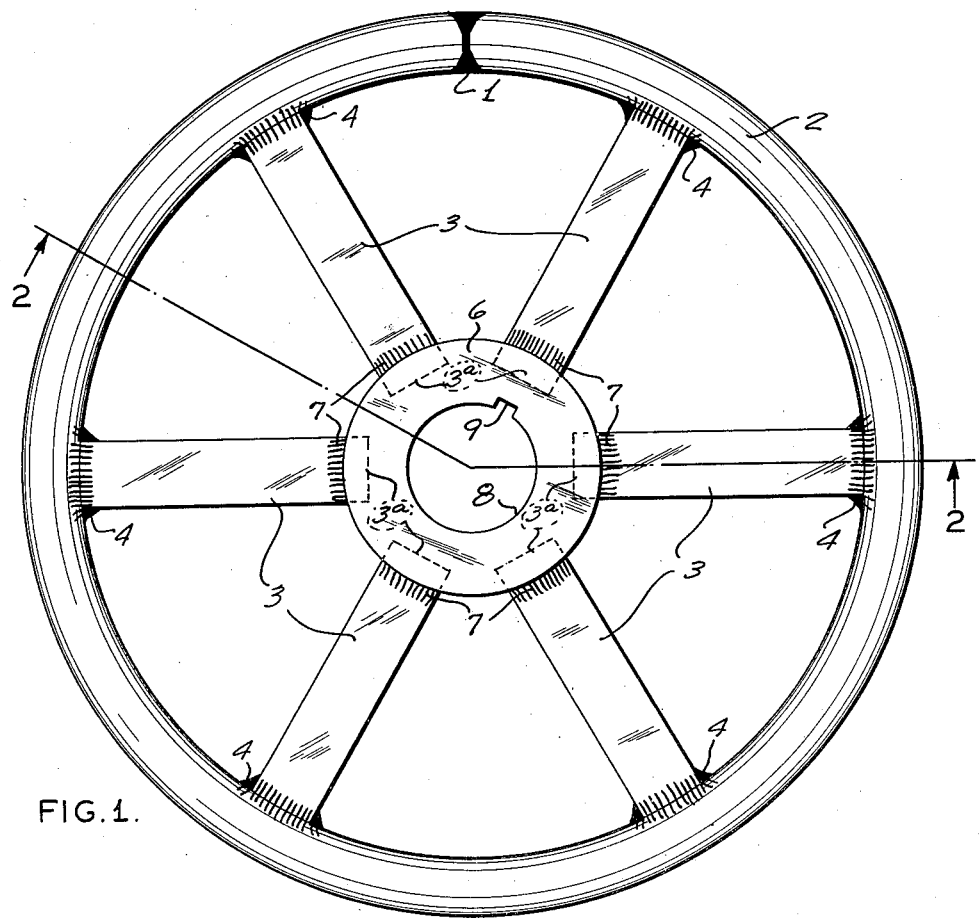
Fig. 1 is a top plan view of my hand wheel.
Figure 2:
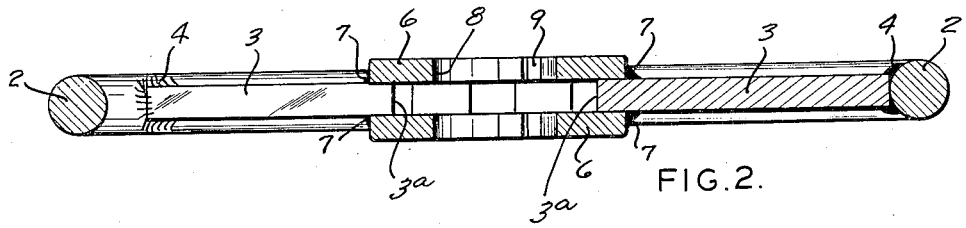
Fig. 2 is a sectional view taken on line 2—2, Fig. 1.

For the purpose of this specification I have illustrated my method as employing cylindrical bar stock for the rim of the wheel, but it is to be understood that the bar stock could be any standard shape in cross-section, or tubular, without departing from the spirit of the invention.

In employing my method I ascertain the circumference of the rim of the wheel to be produced and cut a section of bar stock metal of equal length. I bend this section of bar stock into circular shape and weld the free ends thereof together, as at 1, to form the rim 2 of the wheel. A plurality of spokes 3 is welded, as at 4, preferably at regularly spaced intervals to the inner wall of the wheel rim 2. These spokes extend inwardly from the rim 2 so that they converge toward a point at the center of said wheel rim. The spokes 3 as shown in the drawing are formed of straight sections of material, but if preferred they may be curved, for instance in a substantially zig-zag line, to provide a greater amount of surface for the radiation of heat therefrom.

A pair of registering metal plates 6 is positioned at the center of the wheel, one on each side of the spokes 3, so that the inner ends 3ª of said spokes will lie between the plates 6, where they are welded in position, as at 7. The plates 6 are provided with registering central apertures 8, which are shown as being circular in the drawings, but the apertures 8 may be of any shape to conform to the cross-sectional shape of the mating valve stem with which it is to be associated. The inner ends 3ª of the spokes need not extend between the plates to the apertures 8, but on the contrary may stop some distance short of these apertures, so that there is less metal in direct contact with the hot mating stem, thereby minimizing the amount of heat that is conducted to the rim of the wheel. Also between the plates 6 there is space extending from each spoke 3 to the next and from the spoke ends to the stem, thereby providing means for the circulation of air to carry off a substantial proportion of the heat conducted from the hot stem. This construction permits a portion of the heat from the valve stem (not shown) in the apertures 8 to be thrown off through all of the above-mentioned spaces instead of being transmitted through the spokes 3 to the wheel rim 2.

When the central apertures 8 are of circular shape, a key opening 9 is cut through the registering plates, as shown in Fig. 1, but when the central apertures are of any other shape it will not be necessary to provide a key opening to rigidly attach the wheel to the stem so that they will rotate as one unit.

In assembling the wheel the procedure is as follows: The wheel rim 2, spokes 3, and plates 6 have all been formed to the proper length and shape, and these are then placed in a jig that will hold these parts in proper position with relation to each other. The welding at 1, 4, and 7 may then be completed while the parts are in the jig, or the various parts may be tacked by welding in their proper positions and the welding may be completed after the wheel has been removed from the jig. The apertures 8 may be formed prior to assembly in the jig, or for greater accuracy may be finished after the wheel has been completely welded. The number of spokes 3 and their size and spacing may be as desired with reference to the wheel rim, depending upon the size of the wheel and the work it is to perform.

When this has been completed the wheel is removed from the jig, and, from what has been said, it is obvious that a wheel of great strength, having all its parts welded together, has been produced without the necessity of casting or molding any part thereof; and also that a substantial amount of the heat ordinarily transmitted through the stem from the contents of the pipe line to the wheel has been prevented from reaching the wheel by my construction herein set forth; and that portion actually transmitted by contact is partially dissipated by radiation through the plates 6 and spokes 3, whereby the rim 2 may be comfortably operated from a temperature standpoint by reason of being much cooler than would be the case with the customary hand wheel.

I claim:

A hand wheel comprising a rim, a series of inwardly extending spokes each welded at an end thereof to the inner circumference of said rim, and a pair of apertured plates forming the hub of said hand wheel, the inner ends of said spokes being positioned between said plates and spaced away from each other so as to provide a continuous passageway for the free circulation of air between said plates and between and around said inner ends of said spokes.

FRED C. FANTZ.

REFERENCES CITED

The following references are of record in the file of this patent:

UNITED STATES PATENTS

| Number | Name | Date |
|---|---|---|
| 1,405,105 | Drumb | Jan. 31, 1922 |
| 2,347,634 | Parkin et al. | Apr. 25, 1944 |
| 2,351,289 | Rickard | June 13, 1944 |

OTHER REFERENCES

"Arc Welding," Lincoln Electric Co., Cleveland, Ohio, Nov. 1926, page 87.